Figure 1:
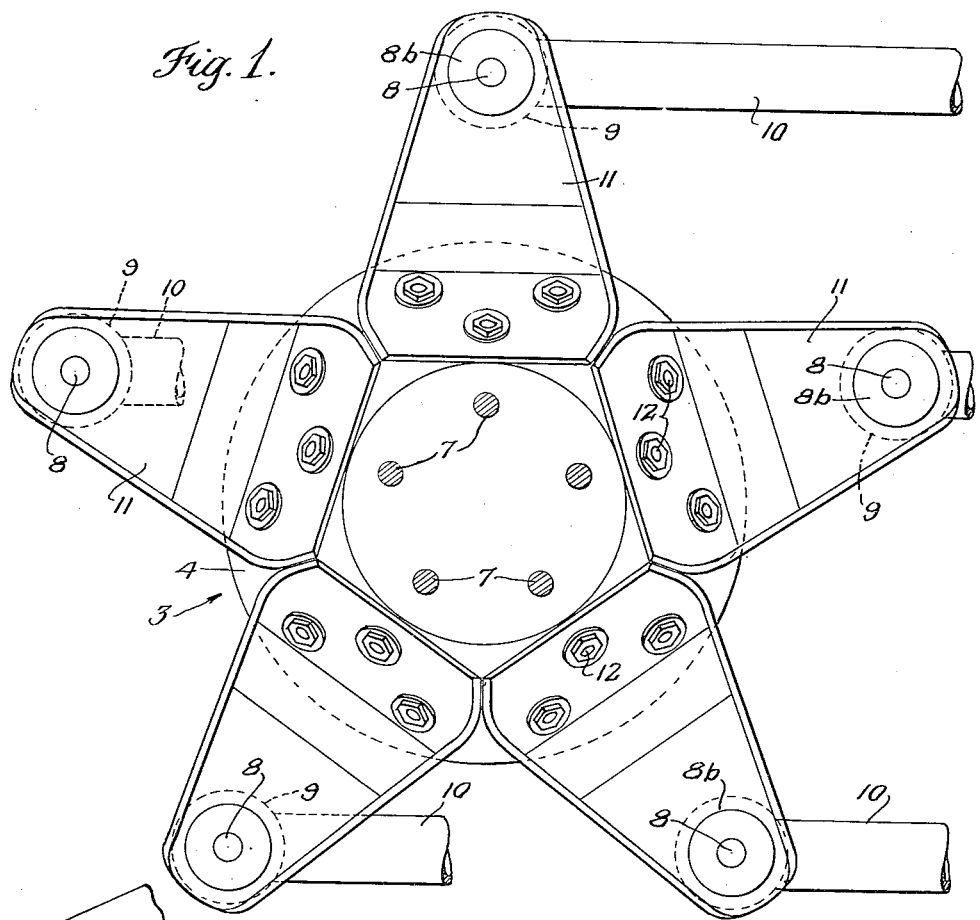

Sept. 11, 1956 W. VUTZ 2,762,189
SIDE DELIVERY RAKE SPIDER
Filed Sept. 11, 1953 2 Sheets-Sheet 1

INVENTOR
Wilhelm Vutz
By Richard E. Babcock Jr.
ATTORNEY

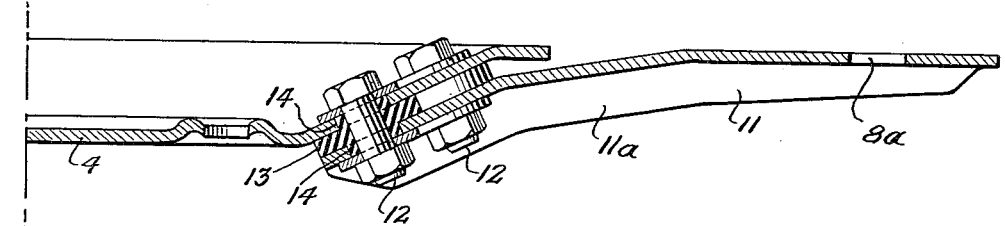
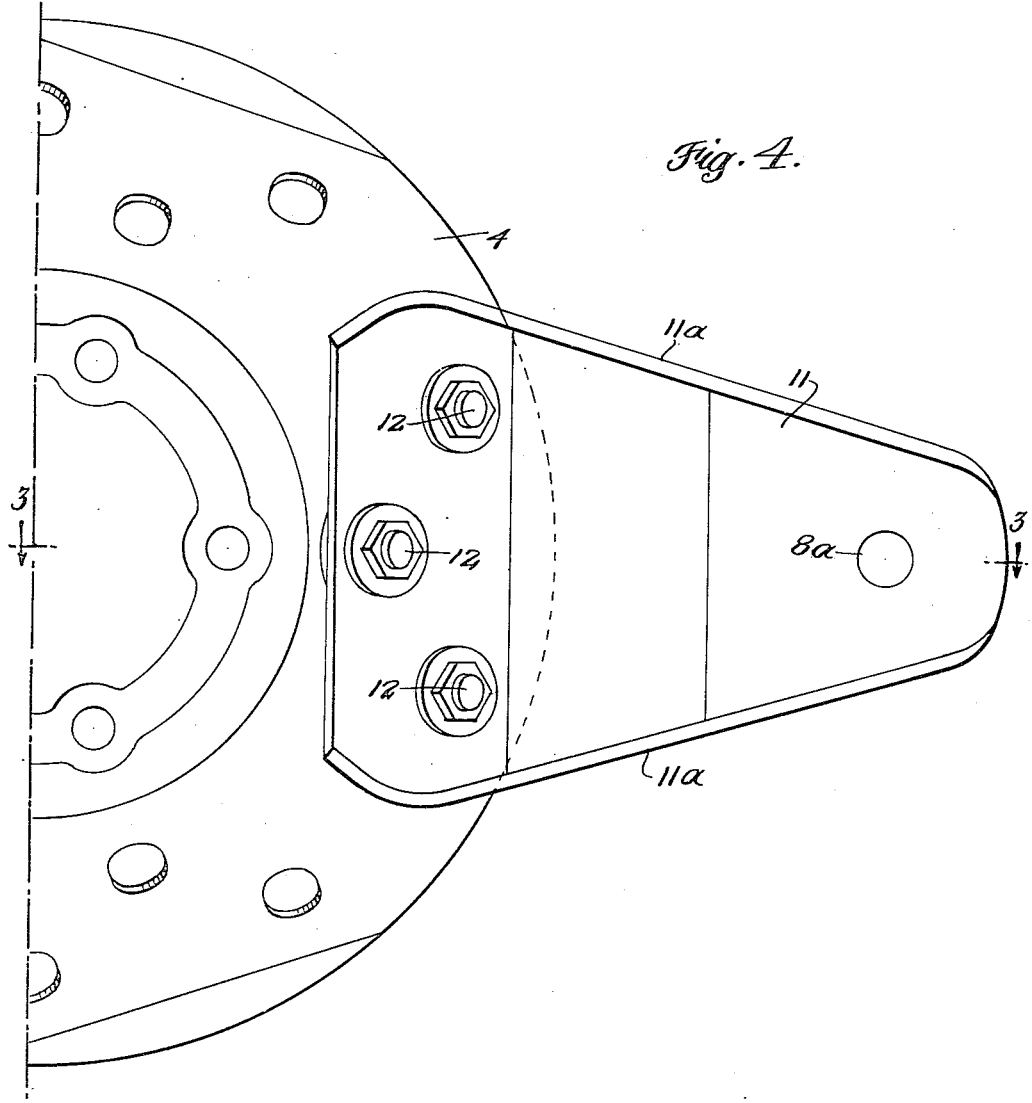

United States Patent Office 2,762,189
Patented Sept. 11, 1956

2,762,189

SIDE DELIVERY RAKE SPIDER

Wilhelm Vutz, Lititz, Pa., assignor, by mesne assignments, to Sperry Rand Corporation, New Holland, Pa., a corporation of Delaware Application September 11, 1953, Serial No. 379,688

3 Claims. (Cl. 56—377)

This invention relates to a side delivery rake of the roller bar type such as is generally exemplified in the U. S. Patent 818,899, to Martin, granted April 24, 1906.

In rakes of this type the rake bars extend diagonally between end members or spiders having parallel rotational axes which are laterally and axially displaced from one another, each of the rake bars being pivotally connected to the end members for movement about axes parallel to the rotational axes of the members or spiders.

Since the two spiders are remotely located relative to each other, it is extremely difficult to assemble and maintain them in true parallel relation. In fact under actual manufacturing conditions it is practical only to assemble the rakes with the spiders in approximate parallel relation. Also, the distances between the bearings at the ends of the rather long rake bars must have some practical tolerances and this of course results in varying the effective lengths of the several rake bars. Thus the accumulation of inaccuracies incident to the manufacture of such rakes generally results both in a certain degree of non-parallelism of the spiders and in variations in the effective lengths of the rake bars which will generally result in substantial deflectional stresses on the spiders as well as very substantial stresses on the spider bearings and the connections or bearings between the rake bars and spiders.

In addition, it has been established that under extreme operating speed conditions the rake bars bow out medially of their lengths due to the effects of centrifugal force and tend to a certain extent to deflect toward each other the respective portions of the spiders to which each bar is connected. The resulting stresses are of course in addition to those above mentioned, though perhaps not as great.

Therefore, unless the spiders and their supporting bearings are of quite rigid construction to withstand such stresses it has been found that the spiders or one of them will frequently fail due to the stresses thereon, and the same is true as to the bearings.

The present invention is directed toward the solution of this problem. In accordance with the invention at least one of the spiders which supports the rake bars has rake bar supporting portions thereon which are resiliently connected to the hub of the spider for independent universal deflection responsive to such deflecting forces or stresses.

Figure 2:
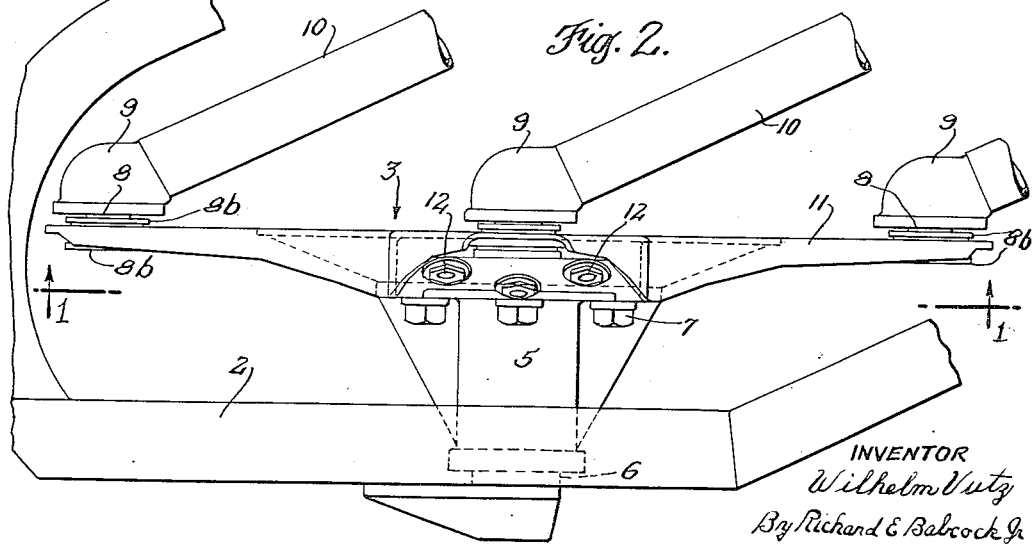

The preferred embodiment of such a spider together with portions of its associated rake structure is illustrated in the accompanying drawing in which:

Figure 1 represents an end elevation of such a spider and portions of its associated rake bars, this view being partly in section along the line 1—1 of Figure 2;

Figure 2, a fragmentary elevation of one end of a side delivery rake embodying the invention;

Figure 3, an enlarged fragmentary diametrical cross-section through the rake spider of the invention, taken on the line 3—3 of Figure 4; and, Figure 4, a similarly enlarged fragmentary elevation of the rake spider.

Referring now in detail to the accompanying drawings, there is illustrated in Figures 1 and 2 one end portion of a roller bar type side delivery rake embodying the invention. The rake structure, except as to the inclusion thereof of the invention is generally similar to that exemplified in the Martin U. S. Patent 818,899 of April 24, 1906, and embodies a rigid ambulatory frame 2 in which is rotatably supported a raking reel. This reel comprises spiders or end supports, only one of which, designated 3 in its entirety is shown. This spider has its hub 4 rotatably supported by a bearing 5 on stub shaft 6 which in turn is rigidly supported on the frame 2. Hub 4 is rigidly connected by an annular series of bolts 7 to the bearing 5. It will be understood that spiders 3 will be thus supported for rotation about non-aligned axes which are parallel to each other but both laterally and axially displaced from one another in echelon formation.

The illustrated spider 3 has a series of stub shafts 8 thereon parallel to its rotational axis and on each of these is journalled a bearing 9 which is fixed to and supports one end of a rake bar 10. The opposite ends of these rake bars will be similarly coupled to a rotatable spider (not shown) so that the bars 10 are supported between the spiders for movement in rotary paths therewith.

Inasmuch as the rake spiders 3 will rarely be assembled or remain in truly parallel relationship, and since there must be some practical tolerance in the effective lengths of the rake bars as heretofore pointed out, it will be readily apparent that the rake bars 10 will exert substantial endwise forces between the spiders during their rotation. The forces exerted by different bars 10 at any given instant may vary considerably and thus will tend to deflect the spiders 3 both axially and circumferentially at their points of connection thereto. It will be apparent that some of the rake bars 10 may exert tensional forces on the spiders 3 in opposition to thrusting forces transmitted by other bars 10, and the forces of either type will vary appreciably, so that there may be fairly substantial deflection of the individual arms 11 both circumferentially and axially of their supporting hub 4. If the spider 3 is made rigid enough to withstand such forces, then these forces must be absorbed by the bearings 9 utilized in the coupling between each rake bar and spider 3 and in the spider bearing 5. This of course is apt to result in failure of many of these bearings.

In the present invention, this difficulty is resolved by providing the spider 3 with a series of radial arms or segments 11 which are separately resiliently mounted on the hub 4 for independently yielding movement, in both axial and circumferential directions (or in other words universally) relative to the rotational axis of the spider, and by coupling the rake bars 10 to these respective arms 11. Thus the arms 11 respectively carry the stub shafts 8 on which are journalled the rake bar bearings 9.

Each of arms 11 is preferably of relatively light stamped metal construction having inwardly turned resilient flanges 11a The pin or shaft 8 may be supported through holes 8a in these arms, annular reenforcing members or pads 8b being fixed to the said arms and to the pins 8 thereon as in Figure 1.

A suitable form of resilient mounting or connection between the hub and each of the several arms 11 is best illustrated in Figure 3 in which the inner end of each radial arm 11 is secured in radially overlapping relation on the hub 4 by a plurality of bolts 12. Washers or pads 13 of rubber or other resiliently compressible material are disposed about the respective bolts between the hub 4 and each arm 11 to permit axial deflection of the arms 11 as above described. In order to also permit axially transverse or circumferential deflection of these arms, in directions normal to the bolts 12, resilient bushings 14 preferably integral with the washers 13 project axially of each bolt between it and either or both of the associated members 4 and/or 11. The bolt receiving holes through said members 4 and 11 are enlarged relative to the bolts 12 to receive such bushings 14. Thus it will be seen that the arms 11 will be free to resiliently yield universally and independently relative to each other and to the hub 4 to absorb the separate and varying stresses transmitted by the rake bars 10. This will of course prevent any undue stresses in the bearings 9 or 5 and the spider 3 incident to operation of the rake and will thus avoid failure of these parts due to such stresses.

The bowing of the rake bars incident to the action of centrifugal force will tend to slightly cant the bearings 9, however, such canting or twisting of the bearings will normally be relatively slight and the bearings 9 will be normally chosen to have sufficient play to absorb such canting or twisting without damage.

In this application, I have shown and described the preferred embodiment of my invention by way of illustrating the preferred mode of carrying out the invention. However, I recognize that the invention may assume various forms or modifications and that its several details may be modified in various manners without departing from the invention. Accordingly, the drawings and description herein are to be construed as merely illustrative in nature and not as exclusive.

Having thus described the invention, I claim:

1. In a side delivery rake of the roller bar type, a rake spider including a hub mounted for rotation about a fixed axis, a plurality of radial arms each of which is mounted in radially overlapping relation on said hub, rigid means disposed through relatively enlarged holes in each of said arms and the hub, washers of resilient material interposed about the respective rigid means between the overlapping portions of each arm and the hub, and resilient bushings integral with said washers projecting into the said enlarged holes and around the respective rigid means.

2. A side delivery rake of the roller bar type, comprising a rake spider including a central hub member mounted for rotation about a fixed axis, a plurality of radial arm members mounted on said hub member, rigid means individually interconnecting each of said arm members to said hub member, a resilient pad interposed between each of said arm members and said hub member, and a resilient bushing disposed between each of the said rigid means and one of its associated members.

3. A side delivery rake of the roller bar type, comprising a rake spider including a central hub member mounted for rotation about a fixed axis, a plurality of radial arm members mounted on said hub member, rigid means individually connecting each of said arm members to said hub member, a resilient pad interposed between each of said arm members and said hub member, and resilient bushings disposed between each of said rigid means and both of its associated members.

References Cited in the file of this patent

UNITED STATES PATENTS

| | | |
|---|---|---|
| 376,969 | Schneidewind | Jan. 24, 1888 |
| 2,621,465 | Klemm | Dec. 16, 1952 |